Figure 1:
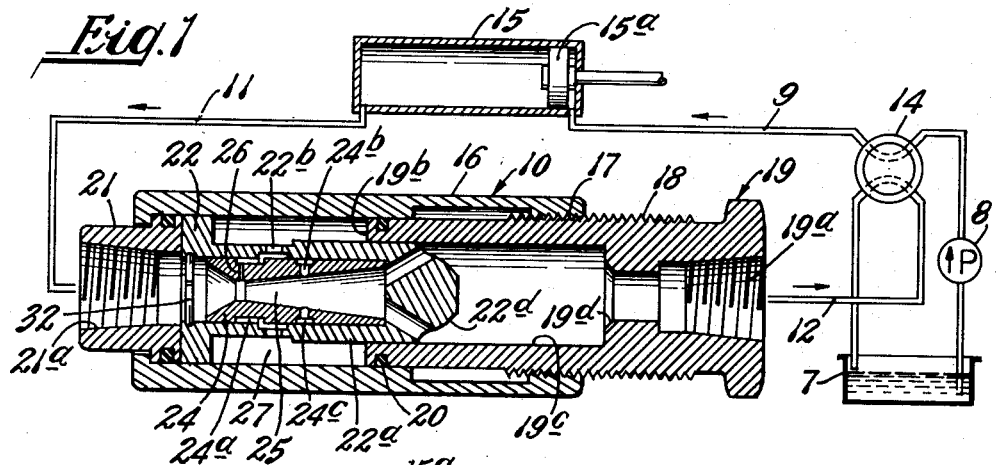

Dec. 29, 1953     C. B. LIVERS     2,664,106

STROKE-LIMITING CONTROL VALVE FOR HYDRAULIC MOTORS

Filed Nov. 29, 1949

INVENTOR.
C. B. LIVERS
BY
ATTORNEY

Patented Dec. 29, 1953

2,664,106

UNITED STATES PATENT OFFICE 2,664,106

STROKE-LIMITING CONTROL VALVE FOR HYDRAULIC MOTORS

Carlos B. Livers, North Hollywood, Calif., assignor to Bendix Aviation Corporation, South Bend, Ind., a corporation of Delaware Application November 29, 1949, Serial No. 130,027

8 Claims. (Cl. 137—643)

This invention relates to hydraulic systems in which a hydraulic motor moves a member to be actuated in response to pressure fluid supplied thereto from a pump or the like through a control valve.

An object of the invention is to provide an auxiliary valve insertable at any point in the fluid line to a hydraulic motor, which valve is responsive to the quantity of fluid flowing therethrough to block fluid flow and thereby stop the motor automatically after it has moved a desired distance.

Another object is to provide an auxiliary valve that blocks the line after a predetermined amount of fluid has passed through it in one direction, but is quickly reset by momentary reversal of fluid flow to permit the predetermined amount of fluid to again flow in the one direction so that a motor in series with the valve can be moved either a predetermined distance or any multiple of that distance.

A more specific object is to provide an auxiliary valve of this type that is small, simple and inexpensive.

Other more specific objects and features of the invention will become apparent from the description to follow.

Essentially, a valve in accordance with the invention comprises a piston that is moved in one direction at a rate less than but proportional to the rate of fluid flow, and blocks the flow passage through the valve after it has moved a predetermined distance. A novel feature of the invention is that the rate of movement of the piston is controlled by the rate at which fluid trapped in front of the piston is released, and the rate of release is determined by the suction at the throat of a venturi through which the line fluid flows. Since the volume displaced by the piston is very small as compared to the total volume of fluid flowing through the valve, the valve can be small and yet control the movement of a motor cylinder of substantial displacement. Another novel feature is an arrangement for directing a large flow against the front of the valve piston in response to reversal of the direction of fluid flow, to quickly reset the piston into starting position, and permit successive movements of the motor through fixed increments of distance.

Figure 2:
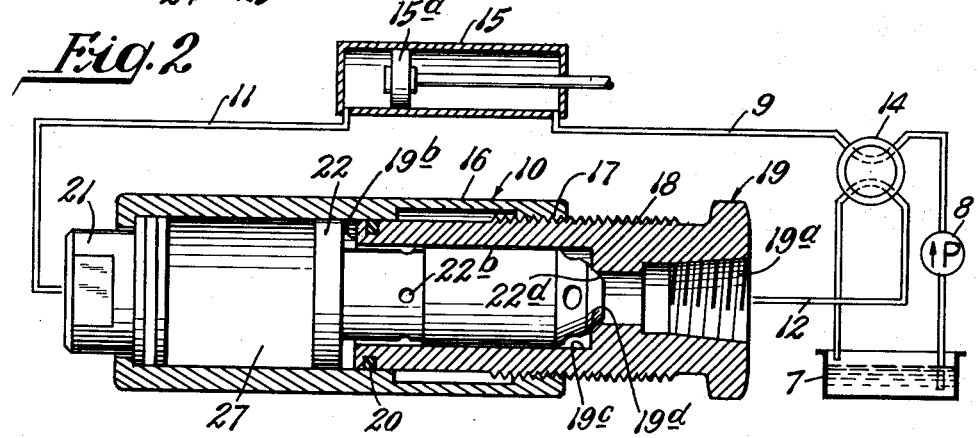
Figure 3:
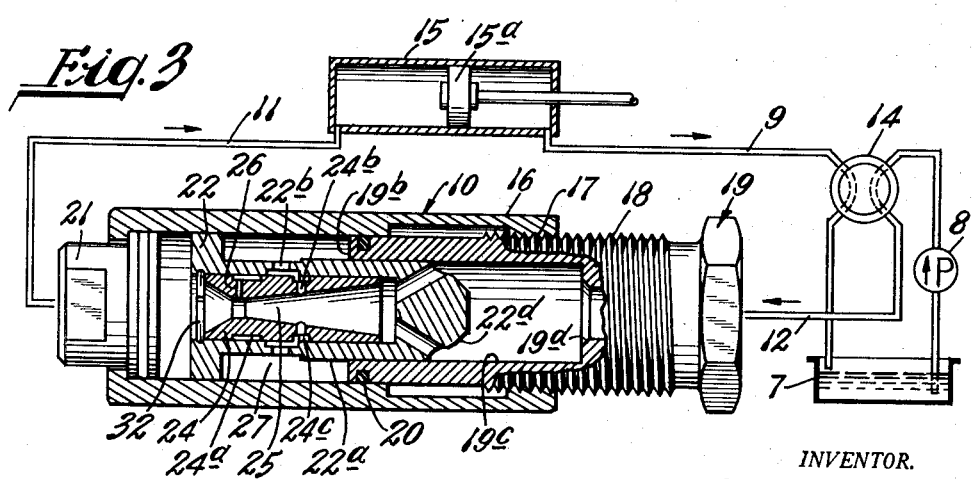

The invention will now be explained by describing a specific embodiment thereof, as illustrated in the drawing, in which:

Fig. 1 is a schematic diagram of a system incorporating a valve in accordance with the invention, the valve being shown in longitudinal section; and Figs. 2 and 3 are diagrams similar to Fig. 1 but showing the apparatus in different positions of operation.

Referring first to Fig. 1, a valve 10 in accordance with the invention is shown connected between a hydraulic line 11 leading to one end of a motor cylinder 15, and a line 12 leading to a 4-way control valve 14. The control valve is connected by a line 9 to the other end of the motor cylinder 15, and also has the usual connections to a pump 8 and a return reservoir 7.

The valve 10 comprises a cylinder 16 having at one end internal threads 17 which engage threads 18 on a closure member 19 that closes the right end of the cylinder 16. The member 19 is sealed with respect to the cylinder 16 by a conventional sealing ring 20. The member 19 contains a port 19a that is connected to the fluid line 12 extending to the control valve 14.

There is positioned within the cylinder 16 a piston 22 that is adapted to reciprocate between a left end position in which it is against an end closure member 21, and a right end postion in which it is adjacent the left end 19b of the adjustable closure member 19. This piston 22 has a smaller piston 22a formed integrally therewith and projecting therefrom to the right and sealing with a cylinder 19c formed in the closure member 19. The piston 22a is hollow and defines a valve cylinder containing a floating shuttle valve 24 that consists of a Venturi tube having a Venturi passage 25 extending therethrough. This passage 25 is in shunt relation to the piston 22 since it permits fluid to bypass the piston without moving it. The throat of the venturi is communicated by a passage 26 with an annular groove 24a in the exterior surface of the Venturi tube, and a second passage 24b communicates a portion of the Venturi passage displaced from the throat thereof with an exterior annular groove 24c.

The valve operates as follows:

Let it be assumed that the piston 15a of the motor 15 is in its right end position, as shown in Fig. 1, and is being moved to the left by fluid flowing from the pump 8 through the 4-way valve 14, and the line 9 into the right end of the motor, the displaced fluid flowing from the left end of the motor 15, through the line 11, the valve 10, the line 12, and the 4-way valve 14 back to the reservoir 7.

The Venturi tube 24 offers some resistance to flow therethrough, producing a pressure drop that maintains the Venturi tube 24 in the right end of its stroke, as shown, and exerts a force urging the piston 22 to the right. In the right end position of the Venturi tube 24, the chamber 27, defined between the piston 22 and the cylinder 16 and the end wall 16b, is connected through a port 22b in the piston 22a and the passage 26 with the throat of the Venturi passage 25. As previously mentioned, the piston 22 is being urged to the right by the pressure drop in the Venturi tube, but the piston 22 can move to the right only as fast as fluid is displaced from the chamber 27 through the ports 22b and passage 26 into the throat of the venturi. This flow of fluid is aided by the suction produced at the throat of the venturi by the line fluid flowing therethrough, and the piston 22 will move to the right at a substantially uniform rate dependent upon the rate of the fluid flow through the valve, until a poppet face 22d on the right end of the piston 22a closes on a seat 19d in the closure member 19, thereby blocking flow of fluid completely, and stopping the motor piston 15a in whatever position it has reached at that time. This position is shown in Fig. 2 of the drawing. The extent of movement of the motor can be varied by screwing the valve member 19 in or out of the cylinder 16, to thereby vary the stroke limit of the piston 22.

When the 4-way valve 14 is manipulated to reverse the flow, fluid enters the port 19a from the valve 14 through the line 12, as shown in Fig. 3, lifting the valve 22d off the seat 19d so that flow can take place through the valve. The flow takes place through the Venturi tube 24, as before, and the pressure drop through the Venturi tube produces a longitudinal force thereon which slides it to the left until it is stopped by a ring 32 in the piston 22. This shift of the Venturi tube cuts off communication between the port 22b and the port 26 but establishes communication between the port 22b and the port 24b which is displaced upstream from the throat of the venturi, where the pressure is higher. Thereupon, pressure fluid is supplied through the port 24b and port 22b to the chamber 27, moving the assembly consisting of the piston 22, the piston 22a and the Venturi tube 24 back into the left end of the cylinder 16. In the leftmost position of the piston 22 fluid can still flow through the valve to insure that the motor piston 15a will be moved into the extreme right end of its stroke.

When next the 4-way valve 14 is again actuated to move the motor piston 15a to the left, initial flow of fluid from left to right through the valve 10 shifts the Venturi tube 24 into its right end position, as shown in Fig. 1 and the operation previously described is repeated.

It will be observed that the port 22b with the port 26 or port 24b defines a passage in series with the piston 22 for conducting fluid displaced by the piston, the latter producing a positive displacement when it moves to the right and a negative displacement when it moves to the left.

The port 24b is large enough to insure the restoration of piston 22 before the motor piston 15a completes its stroke. In fact, the port 24b is preferably made so large that the restoration of the piston 22 into its leftmost position is effected very rapidly, and before the motor piston 15a has travelled back an appreciable distance. Therefore, by momentarily reversing the control valve 14, following stoppage of the motor piston 15a by the auxiliary valve 10, and then shifting the control valve back to the position shown in Fig. 1 the motor piston 15a may be moved beyond the distance for which the auxiliary valve is set. This is highly advantageous in practice where the device actuated by the motor 15 is normally moved through a fixed stroke, but it is occasionally desirable to move the device through a greater stroke.

It will be noted that because of the fact that during movement of the piston 22 only a small proportion of the total fluid flowing through the valve is directed into or out of the chamber 27, the dimensions of the valve 10 can be very small as compared to the volumetric displacement of the motor 15 with which it is used. This result is achieved by the action of the Venturi tube which, during movement of the motor 15 in the stroke-measured direction, draws from the chamber 27 a volume of fluid that is small but proportional to the rate of flow of the line fluid to the motor.

An advantage of the system is that the valve 10 can be located anywhere, requiring only hydraulic, not mechanical, connections to the remainder of the system. This is in contrast to most stroke-limiting valves, which must be mounted upon and be mechanically actuated by the motors they control.

Although for the purpose of explaining the invention, a particular embodiment thereof has been shown and described, obvious modifications will occur to a person skilled in the art, and I do not desire to be limited to the exact details shown and described.

I claim:
1. A valve of the type described comprising: a body having first and second line ports; a piston movable between limits within said body and defining with said body and expansible and contractable chamber on one side of said piston; cooperating main valve elements on said body and said piston respectively, for blocking line fluid flow between said line ports in one end position of said piston, and permitting such flow in other positions of said piston; means defining a main passage in series with said valve elements for conducting line fluid past said piston while producing a pressure drop across said piston to move it toward said one end position in response to fluid flow from said first line port to said second line port, and to move the piston away from said one end position in response to fluid flow in the opposite direction, said main passage means including a Venturi tube, and means defining a passage connecting the throat of the venturi to said chamber.

2. A valve of the type described comprising: a body having first and second line ports; a piston movable between limits within said body and defining with said body an expansible and contractable chamber on one side of said piston; cooperating main valve elements on said body and piston respectively for blocking line fluid flow between said line ports in one end position of said piston and permitting such flow in other positions of said piston; means defining a main flow passage in series with said main valve elements between sad line ports for conducting line fluid past said piston while producing a pressure drop across the piston to move it toward said one end position in response to fluid flow from said first line port to said second line port and vice versa; means defining two auxiliary passages, one more restricted than the other; auxiliary valve means relatively movable between two positions for alternately connecting said two auxiliary passages between said main flow passage and said chamber; said auxiliary valve comprising means exposed to flow through said main passage for moving said valve in the direction of fluid flow to communicate said chamber with said main passage through said more restricted auxiliary passage during flow through said main passage in one direction, and through said other auxiliary passage during flow in the other direction.

3. A valve of the type described comprising: a body having first and second line ports; a piston movable between limits within said body and defining with said body an expansible and contractable chamber on one side of said piston; cooperating main valve elements on said body and piston for blocking line fluid flow between said line ports in one end position of said piston, and permitting such flow in other positions of said piston; means including a Venturi tube defining a main passage in series with said main valve elements between said first and second line ports for conducting line fluid flow past said piston while producing a pressure drop across the piston to move it toward said one end position in response to fluid flow from said first line port to said second line port, and to move the piston away from said one end position in response to fluid flow in the opposite direction; a first auxiliary port in the throat of said Venturi tube; a second auxiliary port between said Venturi throat and said second line port; and auxiliary valve means relatively movable between two positions for alternately connecting said two auxiliary ports to said chamber; said auxiliary valve comprising means exposed to the said pressure drop across said piston for moving the auxiliary valve in the direction of fluid flow whereby said chamber is communicated with said main flow passage through said first auxiliary port during flow through said main passage in one direction and through said second auxiliary port during flow in the opposite direction.

4. A valve according to claim 3 in which said first auxiliary port is smaller than said second auxiliary port whereby said piston is moved away from said one end position more rapidly than it is moved toward it.

5. A valve of the type described comprising: a body having first and second line ports; a piston movable between limits within said body and defining with said body an expansible and contractable chamber on one side of said piston; cooperating main valve elements on said body and piston for blocking line fluid flow between said ports in one end position of said piston and permitting such flow in other positions of said piston; means including a Venturi tube defining a main passage in series with said main valve elements between said first and second line ports for conducting line fluid past said piston while producing a pressure drop across said piston to move it toward said one end position in response to fluid flow from said first line port to said second line port and to move the piston away from said one end position in response to fluid flow in the opposite direction; a first auxiliary port in the throat of said Venturi tube and a second auxiliary port displaced from the throat thereof on the side toward said second line port; means slideably supporting said Venturi tube for limited longitudinal movement, in response to fluid flow therethrough, into one end position or the other depending upon the direction of fluid flow, said Venturi tube supporting means having a port therein connected to said chamber and communicating with said first auxiliary port in the Venturi tube when the Venturi tube is in its end positoin toward said second line port, and communicating with said second auxiliary port in the Venturi tube when the Venturi tube is in its end poistion nearest said first line port.

6. A valve of the type described comprising: a body having first and second line ports; a piston movable between limits within said body and defining with said body an expansible and contractable chamber on one side of said piston; cooperating main valve elements on said body and piston, respectively, for blocking line fluid flow between said ports in one end position of said piston, and permitting such flow in other positions of said piston; means in said body defining a main passage in series with said main valve for conducting line fluid flow past said piston while producing a pressure drop across said piston to move it toward said one end position in response to fluid flow from said first line port to said second line port, and to move the piston away from said one end position in response to fluid flow in the opposite direction; and means communicating said main passage with said expansible and contractable chamber for conducting fluid from said chamber in response to movement of said piston in one direction, and to said chamber in response to movement of said piston in the other direction; said body comprising a first member defining an internal cylindrical surface sealing with said piston, and a second member longitudinally adjustable with respect to said first member and having one of said main valve elements formed thereon, whereby the stroke of said piston is varied by varying the longitudinal position of said second body member with respect to said first body member.

7. A valve of the type described comprising: a body comprising first and second members relatively adjustable longitudinally with respect to each other, said first member having an internal cylindrical surface, and said second member comprising a sleeve having an internal cylindrical surface of smaller diameter than said first member and an external cylindrical surface sealing with the internal cylindrical sleeve on said first member; a piston having a large end section sealing in said first member, and a smaller end section sealing in said second member and defining with said first and second members an expansible and contractable chamber; cooperating main valve elements on said piston and said second member for blocking line fluid flow between said line ports in one end position of said piston, and permitting such flow in other positions of said piston; a line passage extending through said piston and said second member for conducting line fluid past said piston, that portion of said line passage in said piston having flow resistance to produce a pressure drop across said piston sufficient to move it toward said second member in response to fluid flow from said first line port to said second line port, and to move the piston away from said second member in response to fluid flow in the opposite direction; and means communicating said line passage with said expansible and contractable chamber for conducting fluid from said chamber in response to movement of said piston toward said second member, and to said chamber in response to movement of said piston in the other direction away from said second member.

8. A flow-metering shut-off valve comprising: a body having a pair of line ports and defining a fluid passage therebetween containing a valve seat; a piston reciprocable in said body at a rate in accordance with differential pressure thereacross; a poppet reciprocable with said piston to and away from said seat, said seat limiting the stroke of said piston at one end; stop means limiting the stroke of said piston at the other end; means for producing a relatively low differential pressure across said piston substantially in accordance with the rate of flow through said valve seat in poppet-closing direction; and means for producing a relatively greater differential pressure across said piston in response to the same rate of flow through said seat in poppet-opening direction whereby a greater volume of flow through said seat is required to move said piston and poppet from said stop means to said seat than vice versa; said means for producing said differential pressures across said piston comprising a first passage means in shunt relation to said piston for bypassing fluid past said piston and second passage means in series relation with said piston for the flow of piston displacement fluid and valve means responsive to the direction of flow for decreasing the flow resistance of said second passage means during flow in said poppet-opening direction as compared to the flow resistance during flow in poppet-closing direction.

CARLOS B. LIVERS.

References Cited in the file of this patent

UNITED STATES PATENTS

| Number | Name | Date |
|---|---|---|
| 963,385 | Oleson | July 5, 1910 |
| 2,354,161 | Waterman | July 18, 1944 |
| 2,512,190 | Waterman | June 20, 1950 |